(No Model.)

G. PARCHO.
CAM.

No. 490,982. Patented Jan. 31, 1893.

WITNESSES:
J. A. Criswell
Co. Sedgwick

INVENTOR
G. Parcho
BY Munn & Co
ATTORNEYS.

THE NORRIS PETERS CO., PHOTO-LITHO., WASHINGTON, D. C.

UNITED STATES PATENT OFFICE.

GIACOMO PARCHO, OF SIERRA CITY, CALIFORNIA.

CAM.

SPECIFICATION forming part of Letters Patent No. 490,982, dated January 31, 1893.

Application filed October 12, 1892. Serial No. 448,713. (No model.)

*To all whom it may concern:*

Be it known that I, GIACOMO PARCHO, of Sierra City, in the county of Sierra and State of California, have invented a new and Improved Cam, of which the following is a full, clear, and exact description.

The invention relates to sectional cams for stamp mills, and its object is to provide a new and improved cam which is simple and durable in construction, very effective in operation and arranged for conveniently and securely attaching it to the shaft without disturbing the other cams or removing the shaft from its bearings.

The invention consists of two cam arms each having a half hub, one of the arms being formed with a longitudinal slot extending on both sides of the half hub and adapted to be engaged by a tongue extending to both sides of the half hub of the other cam arm.

The invention also consists of certain parts and details, and combinations of the same, as will be hereinafter described and then pointed out in the claims.

Reference is to be had to the accompanying drawings forming a part of this specification, in which similar letters of reference indicate corresponding parts in all the figures.

Figure 1:
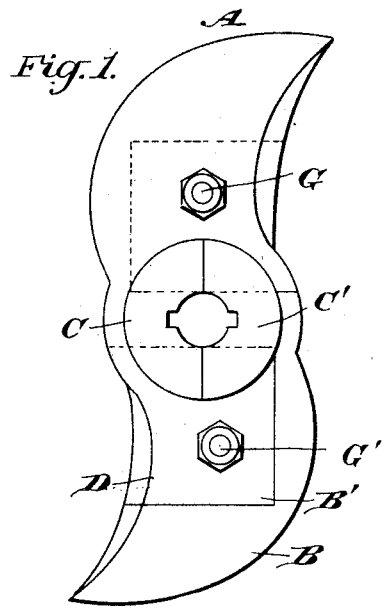
Figure 2:
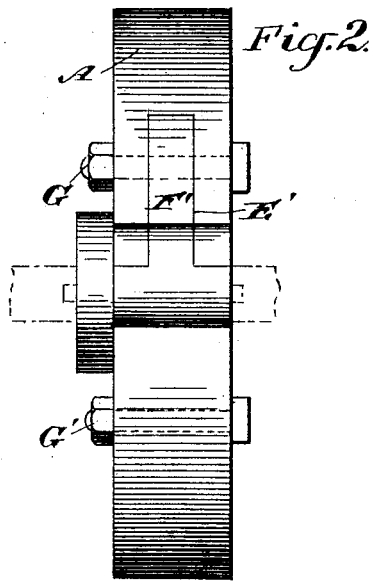
Figure 3:
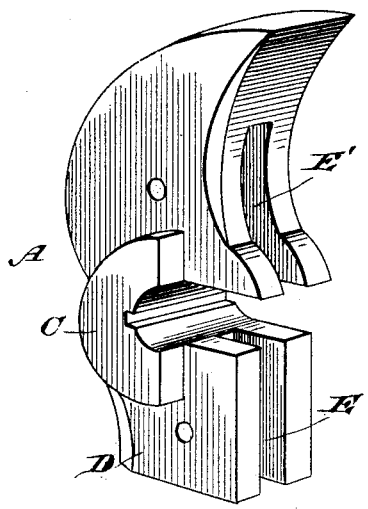
Figure 4:
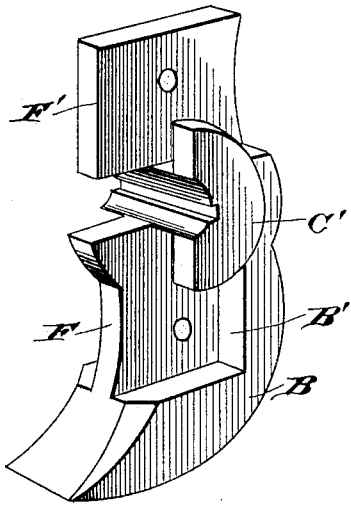

Figure 1 is a face view of the improvement; Fig. 2 is an end view of the same; and Figs. 3 and 4 are perspective views of the cam arms.

The improved sectional cam is provided with the two cam arms A and B formed with a half hub C, C' respectively, adapted to engage the driving shaft and provided with keyways fitting onto keys secured on the shaft, so as to hold the cam securely in place on the driving shaft. The cam arm A is provided with an extension D formed on the side of the half hub C and adapted to fit into a recess B' formed on the cam arm B, as plainly shown in the drawings. The extension D is provided with a slot E leading to the half hub C and extending at right angles thereto, a similar slot E' being formed directly above the slot E on the cam arm A proper.

A tongue F formed on the cam arm B and extending in the recess B' is adapted to fit into the slot E, and a similar tongue F' arranged in line with the tongue F projects from the half hub C' opposite the cam arm A. The tongues F and F' fit into the slots E and E' so that the extension D snugly engages or fits into the recess B' of the cam arm B. When the two cam arms are fitted, one on the other, as shown in Figs. 1 and 2, the half hubs C and C' form a complete hub and the cam edges of the cam arms A and B extend in opposite directions, as plainly illustrated in Fig. 1. In order to fasten the two cam arms together, bolts G and G' are employed of which the bolt G passes through the cam arm A and the tongue F', while the other bolt G' passes through the extension D and the tongue F.

It will be seen that the two cam arms A and B can be readily fitted one on the other to engage the shaft from opposite sides, so that the cam arms form a complete cam and are secured together by the bolts G and G', as above described. It will further be seen that the cam arms can be readily taken apart and removed from the shaft without disturbing the latter or the other cams.

Having thus fully described my invention, I claim as new and desire to secure by Letters Patent,—

1. A sectional cam, comprising two sections each formed with a half hub, one section being provided with a slot extending on opposite sides of the hub and at right angles thereto, and the other section provided with a tongue extending in opposite sides of the hub and fitting in the slot of the first section, substantially as described.

2. The herein described sectional cam, consisting of the section A provided with the half hub C, the extension D and the slots E E' at right angles to the hub, the section B provided with the half hub C', the recess B' and the tongues F F', and the bolts G for securing the parts together, as specified.

GIACOMO PARCHO.

Witnesses:
 JOHN SORRACCO,
 GIROLAMO CASTAGNETTO.